(No Model.)
H. FETTE.
FEEDER FOR HAY PRESSES.
No. 521,261. Patented June 12, 1894.
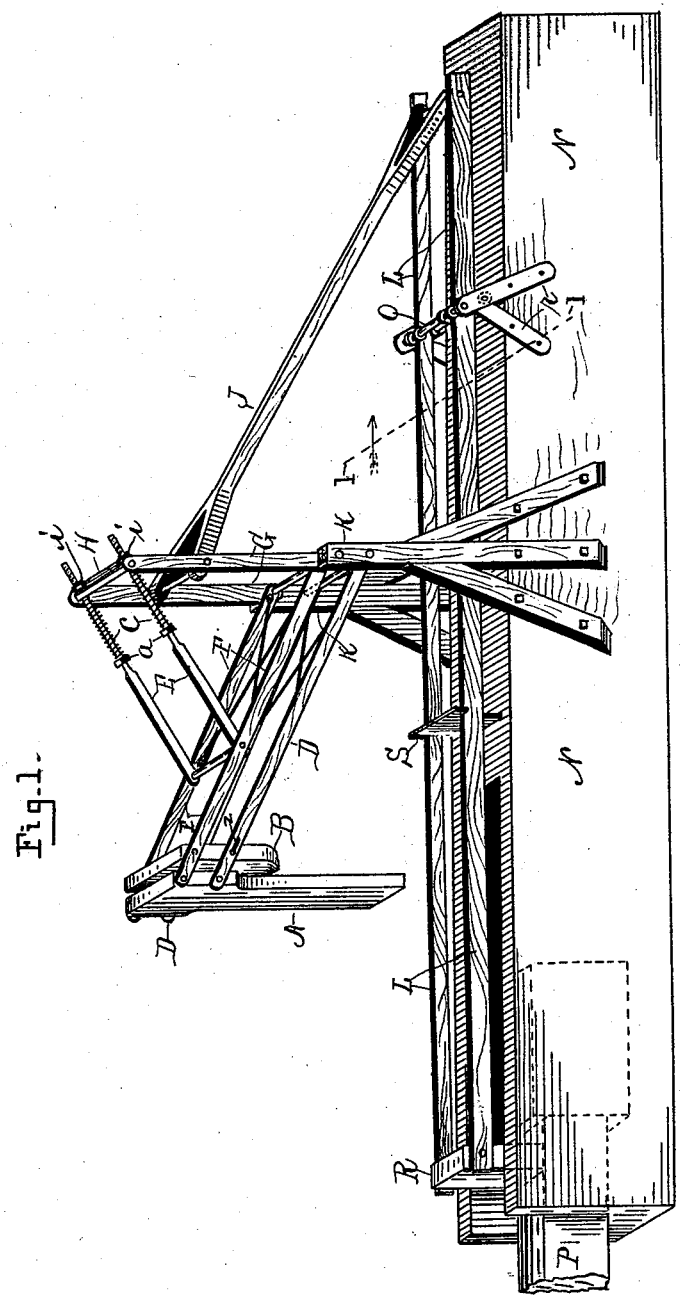
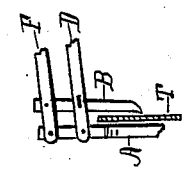
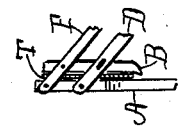
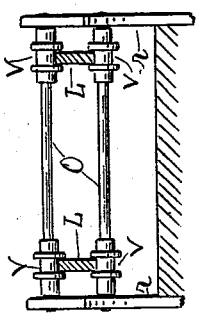
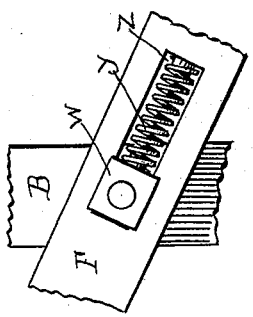
Witnesses:
Ray Hutchins.
Herbert Cowell.
Inventor:
Henry Fette
By Thos. H. Hutchins — Attorney

UNITED STATES PATENT OFFICE.

HENRY FETTE, OF GOODENOW, ILLINOIS.

FEEDER FOR HAY-PRESSES.

SPECIFICATION forming part of Letters Patent No. 521,261, dated June 12, 1894.

Application filed March 23, 1894. Serial No. 504,831. (No model.)

*To all whom it may concern:*

Be it known that I, HENRY FETTE, a citizen of the United States of America, residing at Goodenow, in the county of Will and State of Illinois, have invented certain new and useful Improvements in Feeders for Bale-Presses, of which the following is a specification, reference being had therein to the accompanying drawings and the letters of reference thereon, forming a part of this specification, in which—

Figure 1 is a perspective view of the feed device applied to the bale chamber of a bale press, and Figs. 2, 3, 4, and 5 are detail views of portions of the feed device, Fig. 3 being taken on line 1 of Fig. 1 looking in the direction of the arrow.

This invention relates to certain improvements in a feed device for feeding charges of fibrous material into the bale chamber forward of the reciprocating follower, and of the class wherein the feed device is connected with the follower and arranged to be automatically operated thereby, which improvements are fully set forth and explained in the following specification and claims.

Referring to the drawings N represents the bale chamber of an ordinary bale press for baling fibrous material, only enough of the bale chamber being shown to illustrate the feed device attached to it.

K are a pair of oppositely arranged posts secured at their lower ends to the outer sides of the bale chamber, and have pivotally connected to their upwardly extending ends the arms D, F, and G. The arms D and F are arranged to be parallel with each other, and are pivotally connected at their outer ends to a feed board A in such manner that when said arms swing from their pivot connecting them with posts K, said feed board A will maintain a perpendicular position at all times. The arms F are connected at about their center with the outer ends of the arms G by means of the rods or bars E, the outer ends of said rods E passing through a cross bar H connecting the outer ends of arms E, and pivotally connected with said arms so it may oscillate in its bearings. Nuts *i* are turned on the outer ends of rods E for retaining said rods in said cross bar, and C are coil springs sleeved on said rods E so as to bear up against cross bar H on its side opposite nuts *i*, and bearing at their opposite ends against nuts *a* on said rods, which nuts *a* are for the purpose of giving more or less tension to said springs to regulate the pressure of feed board A, on the charge, and to give a yielding pressure of said feed board on the fibrous material in the feed chamber, so it may not be injured or injure the parts connected with it in case too much of a charge is given to the feed chamber.

L are a pair of parallel bars connected at their forward ends with the reciprocating follower P by means of the standard R, and are connected at their rear ends with arms G by means of the rod J, and pass between rollers O in the grooves V thereof for supporting and guiding their rear ends.

B is a jaw pivotally connected to arms D and F near to and parallel with the inner side of the feed board A, and is for use in holding a division board T shown in Figs. 4 and 5. Said division board is for separating the bales in the operation of baling. When the feed board A is up as shown in Figs. 1 and 4 the jaw B is near enough the said feed board so that the board T will be grasped and held between said jaw and feed board, but when said feed board is down as shown in broken lines, it is separated far enough from said jaw to let said division board drop out into the bale chamber and stand so as to separate two bales of material being formed. Such division board is only intended to be used when enough material has been placed in the bale chamber to form a bale, and it is desired to commence a new bale, and prevents the new bale from adherring to the one previously formed, and also furnishes means for passing the bale ties through between the bales in horizontal grooves that may be formed in the said division board, and not necessary to be shown.

S is a head board which forms a stay for connecting the two bars L at or near their center, and serves to hold the fibrous material being fed to the bale chamber in its proper place, and for bringing said material under the feed board A when the follower P returns from its work.

In operation the fibrous material to be baled is placed in the feed chamber between the bars L and between the standard R and head board S, and on the top of the follower P when it has moved forward to its full stroke against the bale being formed, at which time the feed board A is up out of the way, by means of its connection with the follower P. When the follower P returns it will cause the feed board A to descend and carry the material so placed in the feed chamber down, forward of the follower P into the bale chamber.

I am aware that feed boards such as A, have heretofore been used for this purpose, but I am not aware that said feed board has heretofore been operated by means of such a follower as P through the medium of such devices as are shown and described in this application.

Having thus described my invention, what I claim as new, and desire to secure by Letters Patent, is as follows, to wit:

1. In a bale press the combination of the reciprocating follower P having the standard R forming one end of a feed chamber, the parallel bars L connected at their forward ends with said standard and having the stay head board S for connecting said bars about centrally, the posts K, the bars G pivotally connected to the upper end of said posts, the rod J for connecting bars G with the rear end of the bars L, the grooved rollers O for supporting and guiding the rear ends of the bars L, the parallel arms D and F pivotally connected at their inner ends to posts K and carrying at their outer ends the vertical feed board pivotally connected thereto, feed board A, jaw B pivotally connected to said bars D, F, adjacent to and parallel with said feed board, the rods E for yieldingly connecting the bars F and G and having the coil springs C and adjusting nuts $a$ and $i$, and the perforated cross bar H for carrying the outer ends of rods E all arranged to operate substantially as and for the purpose set forth.

2. In a bale press the combination of the feed board A, yielding jaw B arranged adjacent to and parallel with said feed board, and the parallel bars D and F pivotally connected at their outer ends to said feed board and jaw, and the means for operating said bars D and F substantially as and for the purpose set forth.

HENRY FETTE.

Witnesses:
 EVA M. SMITH,
 THOS. H. HUTCHINS.